April 14, 1942.    C. D. SHELBURNE    2,279,798
LAWN MOWER SHARPENING APPARATUS
Filed Nov. 4, 1940    2 Sheets-Sheet 2
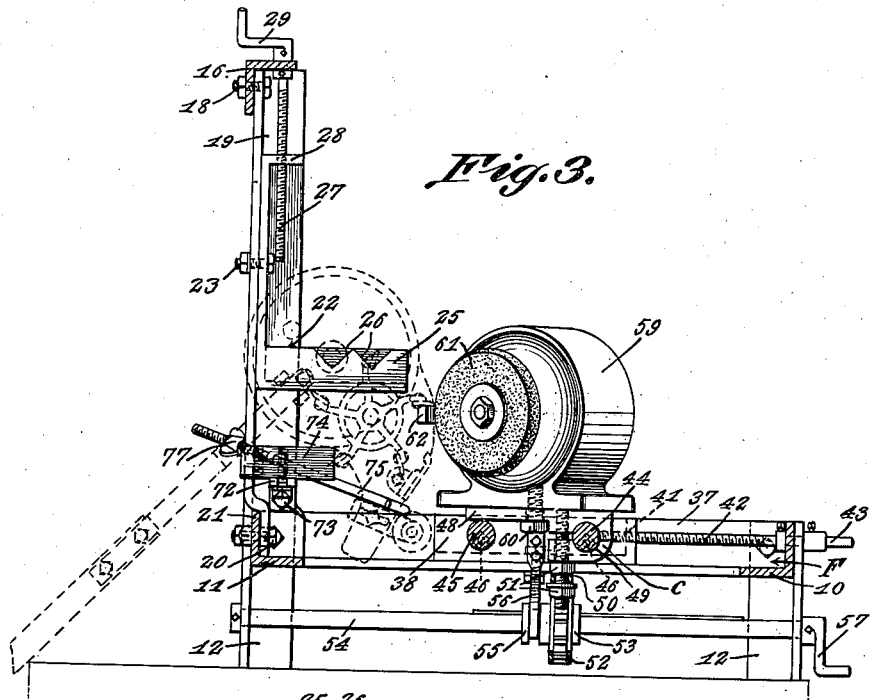
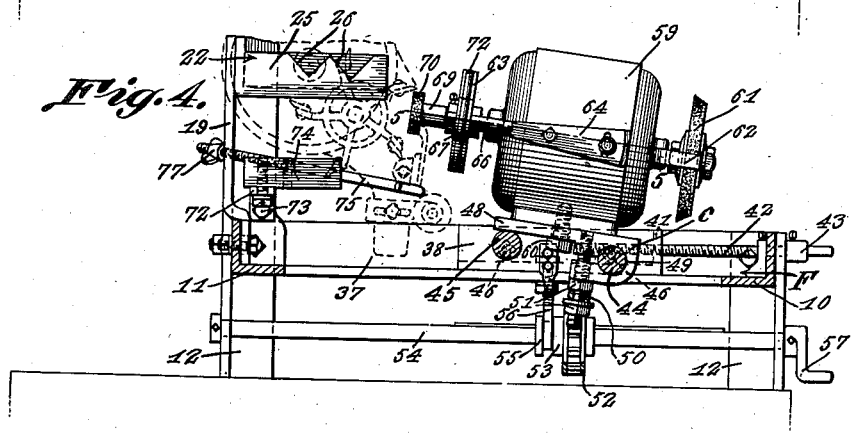
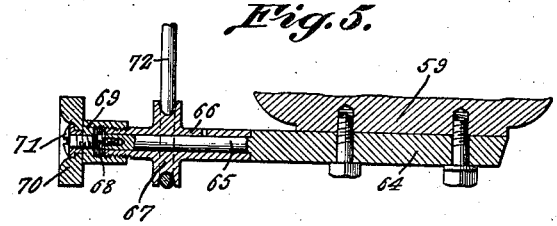
Clyde D. Shelburne, INVENTOR
BY Victor J. Evans & Co.
ATTORNEYS Patented Apr. 14, 1942

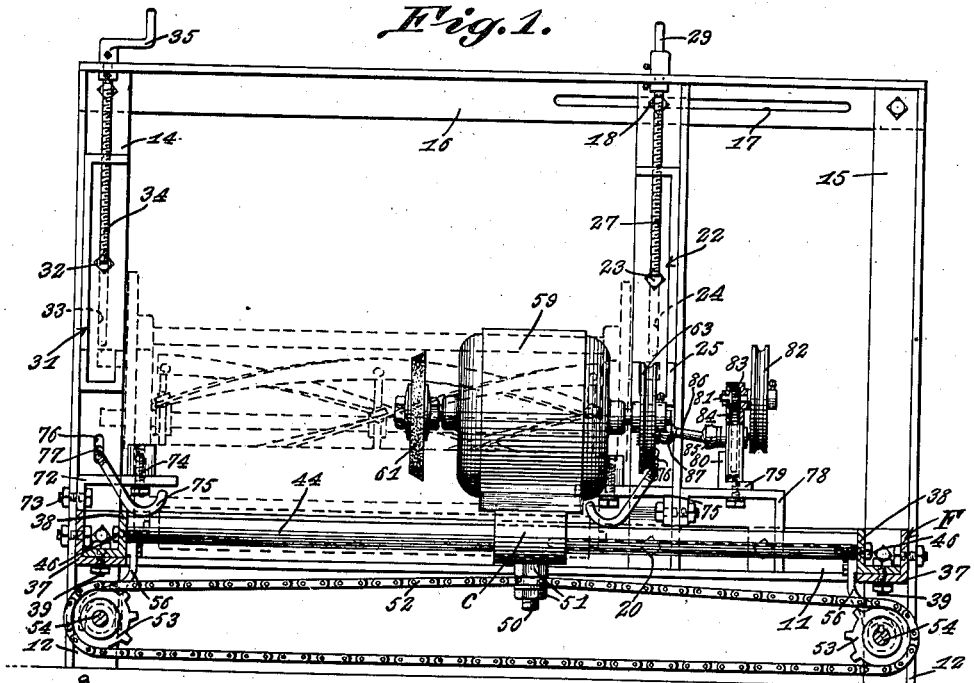

2,279,798

UNITED STATES PATENT OFFICE 2,279,798

LAWN MOWER SHARPENING APPARATUS

Clyde D. Shelburne, Shelburn, Ind.

Application November 4, 1940, Serial No. 364,307

4 Claims. (Cl. 51—3)

The present invention relates to improvements in lawn mower sharpening apparatus.

An object of the invention is to provide a lawn mower sharpening apparatus of generally improved design.

Another object of the invention is the provision of an apparatus embodying tool carrying means adjustable for varying operations as well as different types and sizes of mowers.

A further object of the invention is the provision of an apparatus with which the cutters of a lawn mower can be uniformly sharpened.

Still another object of the invention is the provision of an apparatus of the aforesaid character, which is rapid, convenient and accurate in operation.

Other objects and advantages of the invention will become apparent as the description progresses.

In the accompanying drawings forming a part of this specification and in which like numerals are employed to designate corresponding parts throughout;

Figure 1 is a vertical sectional view taken along line 1—1 of Figure 2,

Figure 2 is a top plan view of the assembled apparatus,

Figure 3 is an end elevational view of the same with parts shown in section and arranged for sharpening a reel blade of a mower, Figure 4 is a similar view showing the apparatus adjusted for sharpening the straight blade of a mower, and Figure 5 is an enlarged longitudinal section taken on line 5—5 of Figure 4.

Referring to the drawings, wherein is illustrated a preferred example of the invention, F generally designates a rectangular elongated frame composed of angular front and rear bars 10 and 11 supported horizontally on vertical corner standards 12 preferably constituting angle bars. At the rear corners of the frame F are secured upstanding angle bars 14 and 15 projecting substantially upward of the horizontal frame and having a longitudinal angle bar 16 bolted to the upper ends. In the vertical flange of the bar 16 is provided a longitudinally directed slot 17 designed to slidably accommodate therein a bolt 18, which serves to fasten to this bar the upper end of an intermediate vertical angle bar 19.

The lower end portion of the angle bar 19 is adjustably fastened, by a bolt 20, to the slotted portion 21 of the rear frame bar 11 so that the upright 19 is adjustable longitudinally on the frame within the limits of the slots. Slidably mounted on the upright 19 is an angle section 22 attached to the member 19 by a bolt 23 engaging a slot 24 in the upright. The vertical section 22 forms part of an angular bracket having a forwardly projecting support section 25 at the bottom end, this latter section having a pair of V-shaped notches 26 formed in the vertical flange thereof. This angular bracket is vertically movable on the upright through the medium of a screw 27 journaled in an aperture of the horizontal flange of the member 16 and engaging a threaded aperture in a web 28 at the top of the section 22. To the upper extremity of the screw is secured a crank 29 having the socket disposed to form a thrust bearing for the screw.

On the fixed upright bar is mounted a complimentary angular bracket 31 slidably attached to the former by a bolt 32 engaging a slot 33 and vertically operable by a screw 34 manually rotatable by a crank 35 so that this bracket may be operated in selected relation with the bracket 22 in the upright 19.

On each side bar 37 of the frame is mounted an angular slide section 38 carrying a bolt 39 extended through a guide slot 40 and having a front web 41. Through a threaded aperture in this web is extended a longitudinal screw rod 42 journaled at the front of the frame and operable by a crank 43, as shown to advantage at Figures 1 and 2. Between these spaced complementary slide sections are disposed a pair of guide rods 44 and 45 arranged longitudinally of the frame and rotatably supported by spindles 46 mounted to extend through bearing apertures in the side flanges of the sections 38. The spindles at the ends of each guide rod are in alignment with each other and eccentric to the axis of the rod, as best shown at Figure 4.

The rods 44 and 45 serve to support a carriage C embodying a platform plate 48 formed at the under side with a split bearing 49 slidably embracing the rod 44. The screw for adjusting this bearing, indicated at 50, carries a pair of spaced nuts 51, which grip therebetween the intermediate portion of an endless sprocket chain 52. This chain is trained over a pair of sprocket wheels 53, each of which is slidably keyed on a transverse shaft 54 journaled at the end of the frame. Each of these sprocket wheels is formed with a grooved extension sleeve 55 which normally engages the forked bottom extension of a bracket 56 having the upper portion rigidly fastened to each slide section 38. The respective shafts 54 are manually operative by a crank 57 secured to the forward portion thereof.

On the platform of the carriage C is fastened an electric motor 59 attached to the plate 48 by a screw 60, which also functions as a pivot connection. On one shaft extension of the motor is fastened a grinding wheel 61 held in position by conventional holding flanges and having the peripheral edge beveled. To the motor casing adjacent the wheel 61 is secured an angular bracket 62 having a leg thereof projecting adjacent the periphery of the wheel to form a work guide or support. On a shaft extension at the opposite end of the motor 59 is secured, in the usual manner, a pulley wheel 63.

To one side of the motor casing is bolted an elongated tapered bar 64 shaped so that one of the bolts extends through a slot therein to enable pivotal adjustment thereof. The longitudinal extension of the bar 64 is shaped to provide a stud 65 on which is rotatably fitted a sleeve 66 formed intermediate its ends with a pulley 67. The outer end of the sleeve is held in position by a screw and washer connection 68 engaging the end of the shaft 65, the exterior end portion of the sleeve being screw threaded to receive thereon a cap 69. To the end of the cap is fastened a grinding wheel 70, which may be smaller in diameter than the wheel 61, but also formed of emery or other abrasive material. The wheel 70 is fixed to the cap by a screw 71 engaging an aperture in the cap 69 to hold the grinding tool firmly in place. A belt 72 trained over the pulleys 63 and 67 serves as a connection for driving the grinding wheel 70 by the motor.

To the uprights 14 and 19 are connected a pair of angular stop brackets 72 fastened by bolts 73 engaging slots in the uprights and carrying transverse rest pieces 74, which coact with a pair of hooks 75 for clamping a mower on the frame. The hooks project through slots 76 in the upright bars and have the rear ends of their shanks screw threaded to carry wing nuts 77 for tightening the same, while the forward hooked ends grip the mower frame. On a stand 78 at the rear of the frame is secured a bearing bracket 79 supporting a casing 80, in the upper portion of which is journaled a horizontal shaft 81 having fixed, on the outer portion, a pulley 82. On the enclosed part of the shaft 81 is fastened a spur pinion 83 in mesh with a relatively large spur gear 84. To the shaft of the gear 84 is connected a ball and socket joint 85 which drives a transmission shaft 86 at the opposite end of which is provided a second ball and socket joint 87 connected to a socket 88 adapted for detachable connection with the end portion of the reel shaft of the mower.

During operation, a mower is mounted in sharpening position by disposing the wheel spindles thereof in opposed notches of the bracket arms 25 after which the arms are vertically adjusted to proper height by rotation of the cranks 29 and 35. The clamping hooks 75 are then arranged to grip the lower portions of the mower frame, as illustrated at Figure 3, wherein the reel cutter blades are in position for grinding. The grinder carrying motor is thereafter arranged at one end of the mower and turned about the pivot 60 so that the motor shaft is in a horizontal position at an angle to the longitudinal axis of the mower and is brought into grinding relation with one of the curved reel blades. The carriage on which the motor is carried is then slid longitudinally along the guide bars 44 and 45 by rotation of the crank 57, which pulls the chain 52 to slide the motor longitudinally of the axis of the mower. Simultaneously therewith the reel is gradually rotated so that the grinding action is effected along a straight horizontal line to accurately grind the edges of the blades.

Upon completion of the reel blade grinding operation the mower is tilted and clamped in the position shown at Figure 4 so as to elevate the straight cutter bar thereof. At this time the motor is turned so that its shaft assumes a position approximately transverse of the mower axis and is tilted at an inclination to the horizontal by rotating the guide rods 45 and 46 about their eccentric pivots so as to raise the rear portion of the platform 48 and lower the forward part, as shown at Figure 4. This adjustment presents the inner face of the grinder 70 to the cutting edge of the mower bar and, upon movement of the carriage longitudinally of the frame, this bar is sharpened.

To lap in the curved reel blades with the straight cutter bar of the mower, that is, to obtain a proper cutting relationship therebetween, the motor is arranged so that the grinder shaft is directed parallel with the axis of the mower reel at one side of the frame and the belt 90 is trained over the pulleys 63 and 82 while the socket 88 is connected with an end of the reel shaft. Thus, rotation of the reel through the intermediacy of the reduction gearing affords means for effecting the desired lapping in operation.

As will be evident, this apparatus provides means for rapidly and efficiently sharpening the blades of the mower and is designed to accommodate and sharpen mowers of varying size.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

What is claimed is:

1. In a lawn mower sharpening apparatus, a frame, a pair of support members slidably mounted on the frame, a pair of parallel rods extending between the support members, a plurality of pivot elements secured to said support members and engaging eccentric bores in the ends of the said rods to rotatably support the said rods, a platform slidably mounted on the rods, and grinding means mounted on the platform.

2. In a lawn mower sharpening apparatus, a frame, a pair of complementary slides supported in slideways on the frame, a pair of parallel rods supported eccentrically on pivots between the slides, a patform slidably mounted on the rods having a bearing embracing one of the said rods, the said platform being tiltable by rotation of the eccentrically supported rods, means for sliding the platform longitudinally on the rods, and a pair of motor driven grinding wheels fastened on the platform.

3. In a lawn mower sharpening apparatus, a frame, a pair of complementary slides supported in slideways on the frame, a pair of parallel rods supported eccentrically on pivots between the slides, a platform slidably mounted on the rods having a bearing embracing one of the said rods, the said platform being tiltable by rotation of the eccentrically supported rods, means for sliding the platform longitudinally on the rods, a drive motor pivotally fastened on the platform, a grinding wheel fastened on a shaft of the motor, a second grinding wheel rotatably supported on a bracket secured to the side of the motor and having its axis parallel with the axis of the motor shaft, and motor driven mechanism for rotating the said second-mentioned grinding wheel.

4. In a lawn mower sharpening apparatus, a frame, a pair of grinder platform supporting rods extending horizontally of the frame, and means mounted on the frame engaging the ends of the said rods so that the rods are rotatable about an axis eccentric to the axis of the rods for tilting the grinder platform transversely of the rods.

CLYDE D. SHELBURNE.